United States Patent Office 3,203,957
Patented Aug. 31, 1965

3,203,957
PRODUCTION OF HALOPYRIDINE OXIDES
Jack R. Kirchner, Grand Island, N.Y., assignor to E. I. du Pont de Nemours and Company, Wilmington, Del., a corporation of Delaware
No Drawing. Filed Mar. 5, 1963, Ser. No. 262,847
5 Claims. (Cl. 260—290)

This invention relates to the preparation of 2-chloro- and 2-bromopyridine oxides and particularly to their preparation by the oxidation of the corresponding 2-halopyridines. These halopyridine oxides are intermediates in the preparation of 2-thiolpyridine oxide which is useful as a bactericide and fungicide.

Because of the electron attracting properties of the chlorine and bromine atoms, the above halopyridines are much more difficult to oxidize than are most other pyridine derivatives. Their oxides can be made by the oxidation of the halopyridines with peroxyacetic acid and Shermer U.S. Patent 2,951,844 discloses that in order to obtain best results substantially less than one mole of peroxyacetic acid per mole of chloropyridine should be employed in carrying out the reaction. Even under the reported best conditions, the conversions of chloropyridine to the oxide were low. Thus, the examples of the patent show the production of 2-chloropyridine oxide in amounts corresponding to conversions of only 39% and 42%, based upon the chloropyridine used. To get the quantitative yields reported, more than half of the starting chloropyridine must be recovered and recycled. Such low conversions and the recycling of so large a proportion of the expensive chloropyridine greatly increase processing costs and decrease the productive capacity per unit of equipment. A further disadvantage of such a method is that it requires the use of the relatively expensive peroxyacetic acid, which, because it is relatively unstable, is generally prepared freshly before use in a separate operation.

Witman U.S. Patent 3,047,579 proposes the preparation of 2-chloropyridine oxide by oxidizing 2-chloropyridine with hydrogen peroxide in the presence of pertungstic acid as catalyst for the reaction. Although that method avoids the use of peroxyacetic acid and the disadvantages attending the use thereof, it involves use of the expensive pertungstic acid as catalyst which must be recovered from the reaction mixture for economic reasons. Furthermore, Example II shows the production of 2-chloropyridine oxide in an amount corresponding to a conversion of only 68% even when using a 20% excess of $H_2O_2$. (The 78% yield value reported in the patent appears to be in error.)

It is an object of the invention to provide an improved method for making 2-chloro- and 2-bromopyridine oxides which does not involve the use of a peroxy acid preformed in a separate operation. A further object is to provide a method whereby high conversions of such halopyridines to their oxides are readily obtained. Still further objects will be apparent from the following description.

The objects of the invention are accomplished by reacting under agitation hydrogen peroxide, 2-chloro- or 2-bromopyridine, and maleic or phthalic anhydride at a temperature of from 30 to about 90° C. The rate of reaction is generally too slow to be practical at temperatures below about 30° C., while temperatures above about 90° C. tend to result in product degradation. The preferred temperatures range from about 45° C. to 70° C., at which temperatures reactions times of 1 to 4 hours are generally adequate. The preferred acid anhydride reactant is maleic anhydride.

Apparently the reaction involves the in situ formation of either monoperoxymaleic acid or monoperoxyphthalic acid, respectively, depending upon whether maleic or phthalic anhydride is used, which monoperoxy acid then oxidizes the halopyridine to its oxide. The reaction is preferably carried out in the presence of an inert solvent simply for the purpose of facilitating physical handling of the reaction mixture. Examples of solvents suitable for this purpose are methylene chloride, perchloroethylene, heptane, benzene, methyl acetate, and ethyl acetate and the like. The reaction can be carried out with excellent results in the absence of such solvents.

The hydrogen peroxide can be employed in the form of any of the commercially available products which contain at least 30% $H_2O_2$ by weight. Those containing at least 50% $H_2O_2$, e.g., 65 to 90% $H_2O_2$, are preferred.

The hydrogen peroxide and halopyridine will generally be employed in approximately equimolar proportions, although an excess of either can be employed. The use of an excess of hydrogen peroxide, e.g., corresponding to from 1.1 to 1.2 moles thereof per mole of halopyridine, will tend to improve somewhat the conversion based on halopyridine, but excesses greater than about 20% are too wasteful and not recommended. The use of less than the theoretical amount of hydrogen peroxide will of course reduce the conversion based on halopyridine; however, the excess halopyridine will then function as solvent and thus reduce or eliminate the need for an inert solvent to facilitate handling. Even though a deficiency of hydrogen peroxide reduces the conversion based on the halopyridine, the conversion realized for any given deficiency of peroxide will generally be substantially better than that obtainable when employing peroxyacetic acid at a corresponding deficiency. The mole ratio of hydrogen peroxide to halopyridine will generally be at least 0.5, and mole ratios of from about 0.95 to 1.05 are distinctly preferred.

At least one mole of the acid anhydride reactant, i.e. maleic anhydride or phthalic anhydride, should be employed per mole of hydrogen peroxide. Most preferably, the number of moles of the acid anhydride employed will equal the sum of the number of moles of hydrogen peroxide plus the moles of water employed, since oxidation efficiency is improved thereby. Larger proportions of the acid anhydride can be used but result in no added advantage. The practice of employing enough of the acid anhydride to react with all of the peroxide and all of the water fed to the reaction mixture is particularly advantageous when the peroxide is added in the form of aqueous solutions containing less than about 80% $H_2O_2$ by weight. While an anhydrous reaction mixture is not essential, it is beneficial as indicated above to employ sufficient of the acid anhydride in excess of that amount molecularly equivalent to the peroxide used to assure that no substantial amount of free water will be present.

Following completion of the reaction, the reaction mixture can be neutralized to a pH of 7 to 8 with caustic soda and the unreacted halopyridine then stripped by distillation from the mixture for recycling as disclosed in the above Shermer patent. The residual mixture of the halopyridine oxide and by-product sodium maleate or phthalate can be used directly for most purposes. If desired, the halopyridine oxide product can be recovered in pure form from the distillation residue using well known recovery and purification procedures.

In the following examples, all composition percentages are by weight, unless indicated otherwise. Examples I to IV illustrate use of the method of the invention to convert 2-chloropyridine to its oxide. The procedures of those examples can be practiced to convert 2-bromopyridine to its oxide with generally similar results.

*Example I*

There were added to a reaction flask equipped with a stirrer, a condenser, a thermometer and a dropping funnel 113.5 g. (1.0 mole) of 2-chloropyridine, 177 g. (1.8 moles) of maleic anhydride and 96.5 g. of methylene chloride. The resulting mixture was heated to 50° C. and then 48.6 g. of aqueous 70% hydrogen peroxide (1.0 mole $H_2O_2$, 0.8 mole water) was added over a period of 0.5 hour. Cooling was used to keep the temperature of the reaction mixture at 50° C. After the addition was complete, stirring was continued at 50° C. for another 1.5 hours. Analysis of the resultant mixture by the procedure of Brooks and Sternglanz (Anal. Chem. 31, 561 (1959)) showed that it contained 105.5 g. of 2-chloropyridine oxide, which amount corresponds to a conversion of 81.6%.

*Example II*

Into a flask equipped as described in the above example, there were placed 113.5 g. (1 mole) of 2-chloropyridine, 177 g. (1.8 moles) of maleic anhydride and 96 g. of n-heptane. The mixture was heated to 70° C. and 48.6 g. of aqueous 70% hydrogen peroxide (1.0 mole $H_2O_2$, 0.8 mole water) was added dropwise over a period of 0.5 hour. Agitation of the mixture was continued at 70° C. for another 2.5 hours. Analysis of the resulting mixture as indicated in the above example showed that it contained 106.2 g. of 2-chloropyridine oxide, which corresponds to a conversion of 82%.

*Example III*

A reaction was carried out as described in Example I except that methylene chloride was omitted and no solvent was used. At the end of the reaction period, the reaction mixture was a solid mass. It was dissolved in water, and the solution was analyzed as indicated in Example I. The 2-chloropyridine oxide content was found to be 106.5 g., which amount corresponds to a conversion of 82.1%.

*Example IV*

Into a flask equipped as described in Example I, there were placed 227 g. (2 moles) of 2-chloropyridine and 266.5 g. (1.8 moles) of phthalic anhydride. The mixture was stirred and heated to 50° C. and 48.6 g. of aqueous 70% hydrogen peroxide (1.0 mole $H_2O_2$, 0.8 mole water) was added over a period of 41 minutes. After a total reaction period of 3 hours at 50° C., the resulting mixture was found by analysis to contain 100.5 g. of 2-chloropyridine oxide. This amount corresponds to a conversion of 38.8%, based upon the starting 2 moles of chloropyridine. In this example, the excess chloropyridine served as reaction solvent. The conversion based upon hydrogen peroxide, the limiting reactant, was 77.6%.

*Example V*

Into a flask equipped as described in Example I, there were placed 113.5 g. (1.0 mole) of 2-chloropyridine, 181 g. (1.8 moles) of succinic anhydride and 98.5 g. of methylene chloride. The mixture was stirred and heated to 50° C. and 48.5 g. of aqueous 70% hydrogen peroxide (1 mole $H_2O_2$, 0.8 mole water) was added over a period of 36 minutes. After a total reaction period of 5 hours at 50° C., the resulting mixture was found by analysis to contain 44.4 g. of 2-chloropyridine oxide. This amount corresponds to a conversion of 34.4%. A comparison of this conversion with the 81.6% conversion of Example I shows that the use of succinic anhydride gives results far inferior to those obtained using maleic anhydride under similar conditions.

*Example VI*

This example shows the inferior results obtained by a procedure using peroxyacetic acid formed in situ by the reaction of acetic acid and hydrogen peroxide in the presence of an acid cation exchange resin catalyst.

There were added to a reaction flask equipped as described in Example I, 113.5 g. (1.0 mole) of 2-chloropyridine, 33 g. (0.55 mole) of acetic acid and 43 g. of a cation exchange resin in its hydrogen form (23 g. of resin on a dry basis). The resin was a sulfonated copolymer of styrene and 8% divinyl-benzene. The resulting mixture was heated to 70° C. and held at that temperature while 53.5 g. of aqueous 70% hydrogen peroxide (1.1 moles $H_2O_2$) was added over a 0.5 hour period. Stirring of the mixture at 70° C. was continued for another 5.5 hours at which point 74.6% of the $H_2O_2$ had been consumed. The resin was then separated from the reaction mixture and the liquid phase was analyzed as indicated in Example I. The 2-chloropyridine oxide content found was 48 g. which represents a conversion of 37.1% based on chloropyridine or 33.7% based on $H_2O_2$.

*Example VII*

This example shows the inferior results obtained by a procedure involving the use of peroxyformic acid formed in situ by the reaction of formic acid and hydrogen peroxide.

There were added to a reaction flask equipped as described in Example I, 113.5 g. (1.0 mole) of 2-chloropyridine and 53.5 g. (1.2 moles) of 90% formic acid. The mixture was heated to 50° C. and 29.2 g. of 70% hydrogen peroxide (0.6 mole $H_2O_2$) was added in 0.5 hour. After stirring the mixture for a total time of 6 hours at 50° C., 94.7% of the $H_2O_2$ had been consumed. The reaction mixture was analyzed as indicated in Example I. The 2-chloropyridine oxide content was found to be 26.2 g. which corresponds to a conversion of 33.8% based on $H_2O_2$ or 20.2% based on chloropyridine.

A major advantage of the method of the invention is that it results in conversions which are substantially better than those obtainable using the more commonly employed peroxyacetic acid or peroxyformic acid. A further and important advantage is that it eliminates completely the necessity of (1) handling any preformed peroxy acid and (2) synthesizing any peroxy acid in separate operations as was considered to be desirable in the best method previously proposed using peroxyacetic acid.

The embodiments of the invention in which an exclusive property or privilege is claimed are as follows:

1. The method of preparing 2-chloropyridine oxide comprising reacting at a temperature in the range 30 to 90° C. (a) aqueous hydrogen peroxide containing at least 65% $H_2O_2$ by weight, (b) 2-chloropyridine and (c) maleic anhydride, said aqueous hydrogen peroxide and 2-chloropyridine being employed in approximately equimolar proportions and said maleic anhydride being employed in an amount substantially equal, on a molal basis, to the hydrogen peroxide and water present in the aqueous hydrogen peroxide used.

2. The method of producing a 2-halopyridine oxide comprising reacting at a temperature in the range 30 to 90° C. (a) hydrogen peroxide, (b) a halopyridine of the group consisting of 2-chloropyridine and 2-bromopyridine, and (c) maleic anhydride, employing from 0.5 to 1.2 moles of said hydrogen peroxide per mole of said halopyridine and at least one mole of said maleic anhydride per mole of said hydrogen peroxide.

3. The method of producing a 2-halopyridine oxide comprising reacting at a temperature in the range 45 to 90° C. (a) aqueous hydrogen peroxide containing at least 50% $H_2O_2$ by weight, (b) a halopyridine of the group consisting of 2-chloropyridine and 2-bromopyridine, and (c) maleic anhydride, employing from 0.5 to 1.2 moles of said hydrogen peroxide per mole of said halopyridine and at least one mole of said maleic anhydride per mole of said hydrogen peroxide.

4. The method of producing 2-chloropyridine oxide comprising reacting at a temperature of 45 to 90° C. (a) aqueous hydrogen peroxide containing at least 50% $H_2O_2$ by weight, (b) 2-chloropyridine and (c) maleic anhydride, employing from 0.95 to 1.1 moles of said hydrogen peroxide per mole of said 2-chloropyridine and an amount of said maleic anhydride at least equal, on a molal basis, to the hydrogen peroxide and the water present in said aqueous hydrogen peroxide used.

5. The method of claim 3 wherein the reaction is carried out in an inert solvent.

References Cited by the Examiner

UNITED STATES PATENTS 2,951,844   9/60   Shermer _____ 260—290
3,047,579   7/62   Witman _____ 260—290 X

FOREIGN PATENTS 838,746   6/60   Great Britain.

OTHER REFERENCES

Bobranski et al., "Chemische Berichte," vol. 71 (1938), pp. 2385–2388.

Bohme, "Chemische Berichte," vol. 70 (1937), pp. 379–383.

WALTER A. MODANCE, Primary Examiner.

NICHOLAS S. RIZZO, Examiner.